No. 870,997. PATENTED NOV. 12, 1907.
A. SAUER.
CHANGE SPEED APPARATUS.
APPLICATION FILED JAN. 31, 1907.
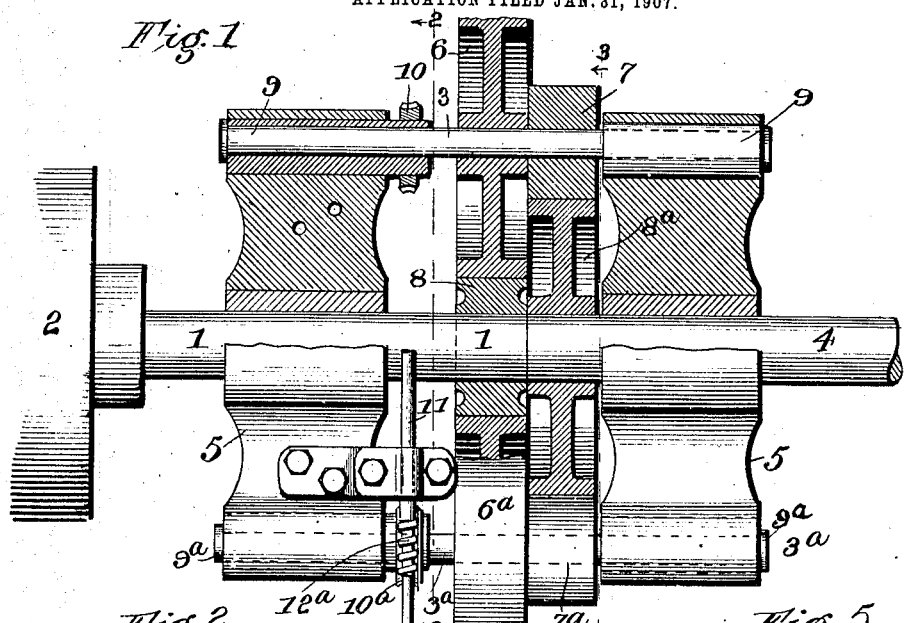
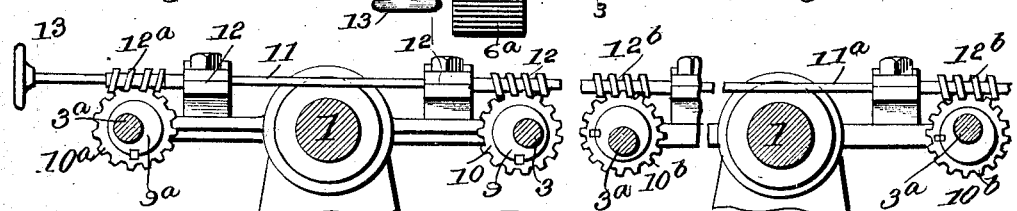
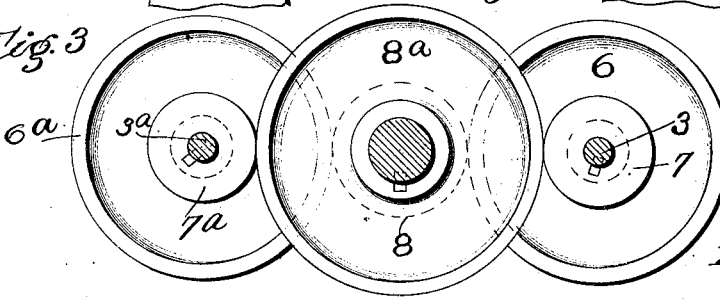
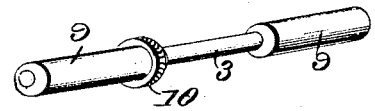
WITNESSES
INVENTOR
ADELBERT SAUER
BY
ATTORNEYS

ADELBERT SAUER, OF PITTSBURG, PENNSYLVANIA.

CHANGE-SPEED APPARATUS.

No. 870,997.    Specification of Letters Patent.    Patented Nov. 12, 1907.

Application filed January 31, 1907. Serial No. 355,037.

*To all whom it may concern:*

Be it known that I, ADELBERT SAUER, a citizen of the United States, and a resident of Pittsburg, in the county of Allegheny and State of Pennsylvania, have invented an Improvement in Change-Speed Apparatus, of which the following is a specification.

My invention is an improvement in friction and toothed gearing for communicating rotary motion from a motor shaft to another shaft arranged for driving machinery of various descriptions. The gearing is shown so constructed and arranged that by substituting gears of one size for others of a different size the speed of the driven shaft may be changed at will relative to the speed of the motor shaft; and a special feature of the invention is the provision of improved means for adjusting the gears, as may be required, to take up wear or compensate for imperfections or irregularities in the bearings.

The details of construction are as hereinafter described and illustrated in the accompanying drawing, in which—

Figure 1 is in part a plan view and in part a horizontal section of my improved apparatus. Fig. 2 is a transverse vertical section on the line 2—2 of Fig. 1. Fig. 3 is a similar section on the line 3—3 of Fig. 1. Fig. 4 is a view illustrating a portion of the apparatus. Fig. 5 is a transverse section illustrating a modification.

The numeral 1 indicates a driving shaft which is connected with a motor 2 of any suitable kind. Said shaft has its bearing in frames or rigid supports 5.

4 indicates a driven shaft which is alined with the driving shaft 1, their ends being juxtaposed, and the same has its bearing in the horizontal frames or supports 5 which are spaced apart.

3 and $3^a$ indicate two smaller, countershafts which are arranged on opposite sides of and parallel to the two alined main shafts 1 and 4 and spaced therefrom. Upon each of these shafts 3, $3^a$, intermediate of the frames or supports 5, are mounted and keyed a large gear and a smaller gear. Those applied to the shaft 3 are indicated by numerals 6 and 7, and those applied to shaft $3^a$ are indicated by $6^a$ and $7^a$, correspondingly.

Intermediate of the two large gears 6 and $6^a$ is arranged a smaller gear 8, the same being mounted and keyed on the driving shaft 1; and intermediate of the smaller gears 7, $7^a$, is arranged a large gear $8^a$, the same being mounted and keyed upon the driven shaft 4. It will now be apparent that rotary motion being communicated to the driving shaft 1, the two larger gears 6 and $6^a$ will be driven from the smaller intermediate one 8, and therefore the smaller gears 7, $7^a$, will be driven also, so that they will rotate the intermediate larger gear $8^a$ and thereby rotate the driven shaft 4.

It is apparent that, since the gears 6, $6^a$, are larger than the engaging gear 8 on the driving shaft, the countershafts 3, $3^a$, will be driven at a greatly reduced speed; but, since the gears 7, $7^a$ on the counter shafts are much smaller than the gears 6, $6^a$, and engage a much larger gear $8^a$ on the shaft 4, the latter will be driven at a much slower speed than the motor shaft. By changing the relative size or diameter of one set of gears, or both sets of gears, it is obvious that any desired change may be made in the speed at which the shaft 4 will be driven. Thus, by the application of such gears the apparatus may be organized for driving any machinery at any required speed, from a primary motor or driver. For this purpose it is proposed that the several gears shall be so attached to their respective shafts that they may be readily detached and others substituted therefor.

In the drawing I have shown friction gears throughout, the same working in contact with each other in a well known manner; but it is to be understood that I propose to employ toothed gears as a substitute therefor when preferred.

I have made special provision for adjusting the gears that work in contact, for the purpose of taking up wear and preventing back-lash and compensating for irregularities or imperfections in the bearings, so that the several gears shall coact in the best manner and work together with the required degree of friction. To these ends I arrange the countershafts 3, $3^a$, eccentrically in bushings, or rotatable bearing cylinders, 9 and $9^a$, the former, 9, being applied to the shaft 3, and the latter, $9^a$, to the shaft $3^a$. These bushings 9, $9^a$, are journaled and adapted to rotate in bearings provided in the frames 5. Upon each of the left-hand bushings 9, $9^a$, shown in Fig. 1, I mount worm gears 10 and $10^a$, respectively, and key them to the bushings 9 and $9^a$, respectively, as shown in Fig. 2, so that the bushings and worm gears always revolve together, the shafts 3, $3^a$, being, however, loose and thus adapted to rotate in the bushings. A small rotary horizontal shaft 11 is mounted rotatably in bearings 12 attached to the frame 3 and is provided with two worms 12 and $12^a$, one engaging the worm gear 10 and the other engaging the worm gear $10^a$, as shown in Fig. 2. On one end of the shaft 11 is mounted a hand-wheel 13 for convenience in rotating the shaft. It will now be apparent that, by rotating the shaft 11 in one direction, the eccentric bushings 9, $9^a$, will be rotated simultaneously and thereby the shafts 3, $3^a$, will either be brought nearer each other or separated more widely, and thus a corresponding change will be made in the contacts of the gears of the two series. In the position in which the bushings and shafts are shown in Fig. 2, the rotation of the worm shaft 11 in either direction will bring the shafts 3, $3^a$, nearer each other because they are shown separated at the greatest distance possible.

It is obvious that the worms 12, $12^a$, must be opposite each other, that is to say, one right-hand and the other left, in order to adapt them to operate in the manner described. In Fig. 5, I show a modification in which a shaft 11ª is provided with worms 12ᵇ which are similar, that is to say, run in the same direction, and the gears 10ᵇ which they engage are of course correspondingly constructed. This arrangement is made possible by arranging the bushings on the shafts 3, 3ª, so that their eccentric portions shall project in opposite directions, say one up and the other down as shown.

What I claim is—

The combination, with a driving shaft a driven shaft alined therewith, countershafts on opposite sides of these two shafts and gears of different diameters which operatively connect the several shafts as described, of rotatable eccentric bearings for the countershafts, fixed supports in which the main shafts and the bushings are mounted, and means for rotating the bushings for adjusting the countershafts laterally, the same consisting of worm wheels keyed on the bushings and a transverse rotatable shaft arranged in suitable bearings and having worms engaging the worm wheels in the manner described.

ADELBERT SAUER.

Witnesses:
M. P. SCHRANKLE,
H. BUNGERT.